Figure 1:
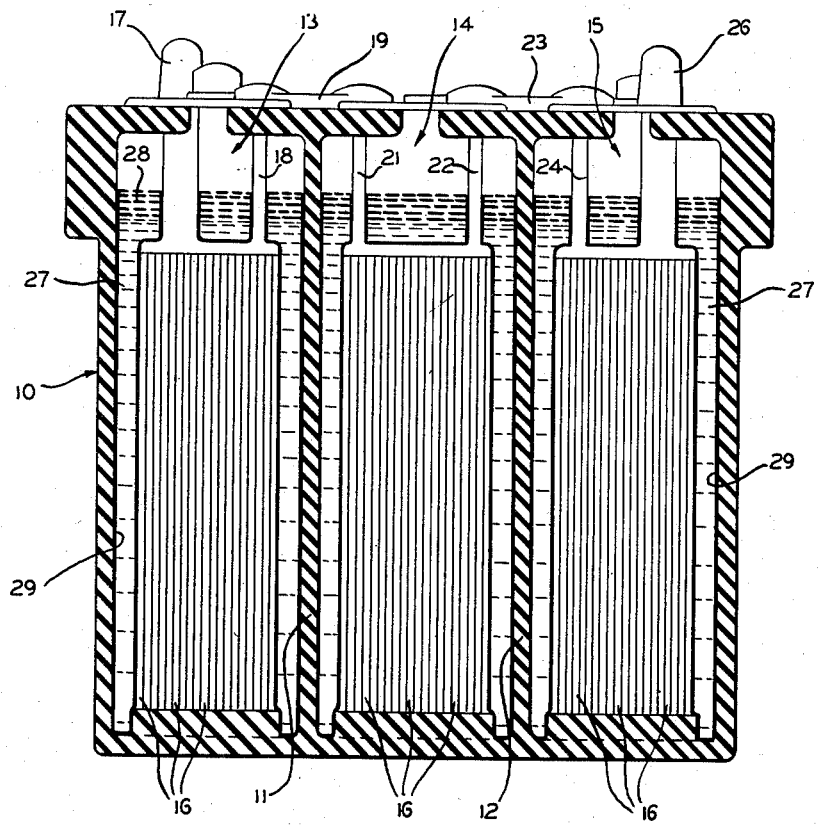

United States Patent Office 2,803,690
Patented Aug. 20, 1957

2,803,690
WET CELL BATTERY

Edward W. Stevens, Madison, Ohio, assignor to Thompson Products, Inc., Cleveland, Ohio, a corporation of Ohio Application March 1, 1956, Serial No. 568,918

7 Claims. (Cl. 136—6)

The present invention is directed to improvements in wet cell storage batteries of the type employed in automobiles and the like.

The most common type of wet cell storage battery in use today includes a case made of hard rubber or the like divided into or containing a plurality of cells, each cell containing a plurality of plates containing an active battery material, which is frequently a paste consisting predominantly of lead oxide. A sulphuric acid electrolyte is included in each cell to generate an electrical potential by electrochemical reaction with the plates. One of the most frequent problems encountered with batteries of this type is due to seepage of the electrolyte through small cracks or capillaries extending through the walls of the cell. The sulphuric acid corrodes the terminals and also the battery cables and thereby substantially increases the contact resistance between the cable and the terminal, and in some cases may cause severe damage to the terminal or the cable.

Another problem associated with conventional wet cell batteries is that of periodic replacement of the water in the electrolyte due to the evaporation of the water during use and during recharging of the battery. Unless the liquid level in the cell is maintained sufficiently high, severe damage to the battery could result.

The present invention provides an improved wet cell battery which overcomes these difficulties and others present in the manufacture and use of storage batteries.

In the battery of the present invention, there is included a barrier liquid layer consisting of an organo-siloxane polymer having a specific gravity less than the specific gravity of the electrolyte so that the polymer floats on the surface of the electrolyte. The inclusion of such a barrier liquid provides several unique advantages to the battery. The siloxane polymer is inert with respect to the electrolyte employed so that the polymer does not adversely affect the chemical composition of the electrolyte, nor does the electrolyte adversely affect the properties of the polymer. In addition, the polymer, particularly in its highly viscous form, has an affinity for the walls of the case and also the plates themselves so that it is possible to provide a thin layer of the polymer, by adhesive attraction, to both the case and the plates. This thin layer helps to reduce the possibility of excessive oxidation of the battery plates and also prevents a capillary leakage of the electrolyte through the walls of the case. The viscous character of the barrier layer also prevents losses of the electrolyte due to sloshing of the electrolyte during handling and also reduces electrolyte loss during battery charging by condensing the vapors as they tend to be driven off from the electrolyte during the charging operation. In addition to all these properties, the polymer is a good dielectric so that there is no tendency for the barrier itself to short out the plates in the cell.

With the foregoing in mind, an object of the present invention is to provide an improved wet cell battery employing a barrier layer therein which substantially minimizes the possibility of electrolyte seepage through the battery case.

Another object of the invention is to provide an improved battery construction employing a viscous barrier layer floating on the surface of the electrolyte and controlling vaporization from the electrolyte.

A still further object of the invention is to provide an improved wet cell battery with a barrier layer which is completely inert to the electrochemical action and which also prevents turbulence in the electrolyte which might arise due to rough handling.

The organo-siloxane polymer employed in the battery of the present invention is a polymer made by combining silicon dioxide with alkyl groups such as methyl or ethyl groups of molecules derived from alcohols, halides, or the like. Other types of polymers useful for the purposes of the present invention may include aryl groups in place of or in addition to the alkyl groups. For most purposes, however, I prefer to employ a methyl polysiloxane polymer having a viscosity of at least 30,000 centistokes at a temperature of 25° C. Particularly good results are obtained by using very high viscosity polymers having viscosities of at least 40,000 centistokes at a temperature of 25° C. and preferably in the range from about 50,000 to 60,000 centistokes. The polysiloxane liquids of this type have a specific gravity of approximate 1.0 so that they will form a flotation layer over a sulfuric acid electrolyte which has a specific gravity in the range from about 1.1 to 1.3. Also, the higher viscosity polymers exhibit an affinity for rubber, and to some extent, metal so that they are capable of forming an adhesive film over the surfaces of the battery case and the plates and thereby prevent electrolyte seepage and excessive oxidation of the battery plates.

A further description of the present invention will be made in conjunction with the attached sheet of drawings in which the single figure is a cross-sectional view, with parts in elevation, of an improved storage battery embodying the principles of the present invention.

As shown on the drawings:

In the attached drawing, reference numeral 10 indicates generally a case composed of hard rubber, synthetic resin, or other material which is electrically nonconductive and which will not enter into the electrochemical reaction between the electrolyte and the battery plates. The case 10 includes integral wall portions 11 and 12 which divide the interior of the case into three cells numbered 13 through 15 inclusive. In each of the cells 13 through 15, there is disposed a plurality of plates 16 usually consisting of a gridwork of lead having apertures therein filled with an active battery paste material containing lead oxide. As in any battery construction, the plates 16 may be separated by means of suitable separators composed of wood, glass fibers or the like.

The plates 16 are so arranged as to provide electrical terminals of opposite polarity, one of the terminals 17 being arranged to receive a cable connector or the like. An electrode 18 of opposite polarity in the cell 13 is connected in series by means of a shorting bar 19 with an electrode 21 of opposite polarity in the cell 14. Assuming that the electrode 17 in the cell 13 represents a negative terminal, electrode 21 would similarly be a negative terminal in the cell 14. The second electrode 22, forming the positive electrode of the cell 14 is connected by means of a shorting bar 23 to a negative electrode 24 in the cell 15. The positive electrode for the battery is a terminal 26 from the cell 15.

Each of the cells has the plates 16 therein covered with a liquid electrolyte 27 which in the illustrated example may be a sulfuric acid electrolyte having a specific gravity ranging from about 1.1 to about 1.3.

A relatively thin layer 28 of the polysiloxane polymer floats on the surface of the electrolyte 27 in each of the cells and provides a barrier layer which resists penetration by vapors from the body of the electrolyte 27. In introducing the barrier layer 28 into the battery, it is advisable to introduce the electrolyte 27 first and then pour the liquid polysiloxane polymer over the electrolyte. Then, by tipping the battery upside down, the layer 28 will float to the opposite end of the cell. Upon returning the battery to its normal position, some of the material from the polysiloxane polymer will remain as a coating 29 along the walls of the battery case 10. Additional amounts of the polysiloxane polymer may appear as a thin film on the plates 16 themselves to provide a barrier layer against oxidation. For most purposes, the polysiloxane polymer should constitute from about 0.5 to 5 percent by volume of the electrolyte in each cell, or enough to provide a supernatant layer of about one-eighth inch in thickness.

Tests made on the improved battery of the present invention indicate that the use of a polysiloxane polymer does not detrimentally affect the electrochemical properties of the battery. In one series of tests, two new 6-volt dry charge batteries were filled with sulphuric acid electrolyte and given a series of controlled discharges to determine their discharge characteristics in the "as received" condition. The test consisted initially of discharging each fully charged battery with a 5 ampere load until the battery voltage dropped to 5.25 volts. These tests indicated that the discharge times of both batteries were essentially equal. The batteries were then recharged and drained of their electrolyte. One battery was filled with a metal polysiloxane fluid having a viscosity of about 500 centistokes at 25° C. A second battery was filled to the same extent with a paraffin oil. Both batteries were allowed to stand over night. After the over night soaking, the fluids were drained from the batteries and replaced with a sulfuric acid electrolyte. Again, the batteries were subjected to a series of controlled discharges in the manner indicated.

The results showed that when a battery had been contaminated with paraffin oil, the number of hours required to discharge the battery from a full charge to a value of 5.25 volts with a 5-ampere load decreased from an original value of about 22 hours to about 13 hours. In contrast, the battery which had been exposed to the polysiloxane fluid evidenced no appreciable change in its discharge characteristics. A sample of the battery acid was analyzed and it was found that only a negligible amount of the polymer was present therein.

From the foregoing, it will be apparent that the barrier layer of the present invention provides an excellent means for controlling evaporation of electrolyte, preventing capillary leakage, and preventing spilling of the electrolyte without affecting the electrochemical properties of the battery. It will also be evident that various modifications can be made to the described embodiments without departing from the scope of the present invention.

I claim as my invention:

1. In a wet cell battery including a casing, means defining a cell within said casing, a pair of electrodes associated with said cell, and a liquid electrolyte in said cell, the improvement which comprises a liquid layer of an organo-siloxane polymer having a specific gravity less than that of said electrolyte floating on said electrolyte.

2. In a wet cell battery including a casing, means defining a cell within said casing, a pair of electrodes associated with said cell, and a liquid electrolyte in said cell, the improvement which comprises a liquid layer of a methyl polysiloxane having a specific gravity less than that of said electrolyte floating on said electrolyte.

3. In a wet cell battery including a casing, means defining a cell within said casing, a pair of electrodes associated with said cell, and a liquid electrolyte in said cell, the improvement which comprises a liquid layer of an organo-siloxane polymer having a viscosity of at least 30,000 centistokes at 25° C. and having a specific gravity less than that of said electrolyte floating on said electrolyte.

4. In a wet cell battery including a casing, means defining a cell within said casing, a pair of electrodes associated with said cell, and a liquid electrolyte in said cell, the improvement which comprises a liquid layer of an organo-siloxane polymer having a specific gravity less than that of said electrolyte floating on said electrolyte, said polymer also providing a thin coating along the walls of said casing to reduce seepage of said electrolyte through said walls.

5. In a wet cell battery including a casing, means defining a cell within said casing, a pair of electrodes associated with said cell, and a liquid electrolyte in said cell, the improvement which comprises a liquid layer of an organo-siloxane polymer having a viscosity of at least 40,000 centistokes at 25° C. and having a specific gravity less than that of said electrolyte floating on said electrolyte.

6. In a wet cell battery including a hard rubber casing, means defining a cell within said casing, a pair of electrodes associated with said cell, and a sulfuric acid electrolyte in said cell, the improvement which comprises a liquid layer of an organo-siloxane polymer having a specific gravity less than that of said electrolyte floating on said electrolyte.

7. In a wet cell battery including a hard rubber casing, means defining a cell within said casing, a pair of electrodes associated with said cell, and a sulfuric acid electrolyte in said cell, the improvement which comprises a liquid layer of a methyl polysiloxane polymer having a viscosity of at least 40,000 centistokes at 25° C. floating on said electrolyte.

References Cited in the file of this patent

UNITED STATES PATENTS

| | | |
|---|---|---|
| 279,839 | Starr | June 19, 1883 |
| 304,265 | Fuller | Aug. 26, 1884 |
| 968,154 | Hite | Aug. 23, 1910 |
| 1,647,021 | Schumacher | Oct. 25, 1927 |
| 2,085,269 | Oppenheim | June 29, 1937 |